United States Patent
Tin et al.

(10) Patent No.: US 9,874,581 B2
(45) Date of Patent: Jan. 23, 2018

(54) IN-SITU BIAS CORRECTION FOR MEMS ACCELEROMETERS

(71) Applicant: Honeywell International Inc., Morris Plains, NJ (US)

(72) Inventors: Steven Tin, Plymouth, MN (US); Chad Fertig, Bloomington, MN (US)

(73) Assignee: Honeywell International Inc., Morris Plains, NJ (US)

( * ) Notice: Subject to any disclaimer, the term of this patent is extended or adjusted under 35 U.S.C. 154(b) by 157 days.

(21) Appl. No.: 14/951,132

(22) Filed: Nov. 24, 2015

(65) Prior Publication Data
US 2016/0334441 A1   Nov. 17, 2016

Related U.S. Application Data

(60) Provisional application No. 62/162,461, filed on May 15, 2015, provisional application No. 62/186,233, filed on Jun. 29, 2015, provisional application No. 62/215,677, filed on Sep. 8, 2015.

(51) Int. Cl.
*G01P 21/00* (2006.01)
*G01P 15/13* (2006.01)

(52) U.S. Cl.
CPC ............ *G01P 21/00* (2013.01); *G01P 15/131* (2013.01)

(58) Field of Classification Search
CPC ....... G01P 15/125; G01P 15/131; G01P 21/00
See application file for complete search history.

(56) References Cited

U.S. PATENT DOCUMENTS

| | | | |
|---|---|---|---|
| 3,275,835 A | 9/1966 | Morrison | |
| 4,429,573 A | 2/1984 | Walker | |
| 5,559,358 A | 9/1996 | Burns et al. | |
| 5,969,249 A | 10/1999 | Roessig et al. | |
| 6,350,983 B1 | 2/2002 | Kaldor et al. | |
| 6,668,111 B2 | 12/2003 | Tapalian et al. | |

(Continued)

FOREIGN PATENT DOCUMENTS

| | | |
|---|---|---|
| CN | 101458152 B | 12/2010 |
| EP | 2128565 A1 | 12/2009 |

(Continued)

OTHER PUBLICATIONS

Chan et al., "Optical and mechanical design of a 'zipper' photonic crystal optomechanical cavity," Optical Society of America, Optics Express, vol. 17, No. 5, Mar. 2, 2009, pp. 3802-3817.

(Continued)

*Primary Examiner* — David A Rogers
(74) *Attorney, Agent, or Firm* — Shumaker & Sieffert, P.A.

(57) ABSTRACT

In some examples, an accelerometer may self-calibrate while in use by setting a scale factor of the accelerometer to a first value; while the scale factor of the accelerometer is set to the first value, obtaining a first acceleration value; setting the scale factor of the accelerometer to a second value; while the scale factor of the accelerometer is set to the second value, obtaining a second acceleration value; based on the first acceleration value and the second acceleration value, determining a bias correction value; obtaining a third acceleration value; and correcting the third acceleration value based on the bias correction value.

19 Claims, 13 Drawing Sheets

(56) References Cited

U.S. PATENT DOCUMENTS

| | | | |
|---|---|---|---|
| 6,776,042 B2 | 8/2004 | Pike et al. | |
| 6,978,673 B2 | 12/2005 | Johnson et al. | |
| 7,444,868 B2 | 11/2008 | Johnson | |
| 7,605,391 B2 | 10/2009 | Burns | |
| 7,881,565 B2 | 2/2011 | Kilic et al. | |
| 7,980,115 B2 | 7/2011 | Stewart et al. | |
| 8,205,497 B1 | 6/2012 | Okandan et al. | |
| 8,334,984 B2 | 12/2012 | Perez et al. | |
| 8,616,055 B2 | 12/2013 | Geen | |
| 8,640,542 B2 | 2/2014 | Zhang et al. | |
| 8,726,732 B2 | 5/2014 | Littler et al. | |
| 8,783,106 B1 | 7/2014 | Nielson et al. | |
| 8,849,075 B2 | 9/2014 | Painter et al. | |
| 8,860,933 B2 * | 10/2014 | Compton | G01N 21/00 356/460 |
| 8,873,029 B2 | 10/2014 | Wilfinger et al. | |
| 8,904,867 B2 | 12/2014 | Martin et al. | |
| 9,030,655 B2 * | 5/2015 | Strabley | G01P 21/00 356/72 |
| 9,069,004 B2 | 6/2015 | Bhave et al. | |
| 2010/0063763 A1 * | 3/2010 | Rozelle | G01C 19/5691 702/92 |
| 2012/0103099 A1 | 5/2012 | Stuke et al. | |
| 2012/0265481 A1 * | 10/2012 | Stewart | G01P 15/131 702/141 |
| 2014/0016118 A1 * | 1/2014 | Compton | G01N 21/00 356/72 |
| 2014/0022534 A1 | 1/2014 | Strabley et al. | |
| 2014/0096587 A1 | 4/2014 | Stewart et al. | |
| 2014/0208823 A1 | 7/2014 | Trusov et al. | |
| 2014/0230520 A1 * | 8/2014 | Bulatowicz | G01P 15/125 73/1.38 |
| 2015/0020590 A1 | 1/2015 | Painter et al. | |

FOREIGN PATENT DOCUMENTS

| | | | |
|---|---|---|---|
| EP | 2717060 A1 | 4/2014 | |
| EP | 2770331 A1 | 8/2014 | |
| WO | 2004012201 A2 | 2/2004 | |
| WO | WO 2005069016 A1 * | 7/2005 | G01P 15/0802 |
| WO | 2006096741 A1 | 9/2006 | |
| WO | 2007098788 A1 | 9/2007 | |
| WO | 2013131067 A1 | 9/2013 | |
| WO | 2015059511 A1 | 4/2015 | |

OTHER PUBLICATIONS

Davies et al., "Remote Photothermal Actuation for Calibration of In-Phase and Quadrature Readout in a Mechanically Amplified Fabry-Perot Accelerometer," IEEE Photonics Journal, vol. 6, No. 3, Jun. 6, 2014, 16 pp.

Zabit et al., "A self-mixing displacement sensor compensating parasitic vibration with a MEMs accelerometer," 2011 IEEE Sensors, Oct. 28-31, 2011, 4 pp.

U.S. Appl. No. 14/847,880, by Honeywell International Inc. (Inventors: Chad Fertig et al.), filed Sep. 8, 2015.

U.S. Appl. No. 14/996,116, by Honeywell International Inc. (Inventors: Chad Fertig et al.), filed Jan. 14, 2016.

Extended Search Report from counterpart European Application No. 16168174.7, dated Aug. 1, 2016, 7 pp.

Yu et al., "A Vibration-Based MEMS Piezoelectric Energy Harvester and Power Conditioning Circuit," Sensors vol. 14, No. 2, Jan. 21, 2014, 19 pp.

Alegre et al., "Optomechanical zipper cavity lasers: theoretical analysis of tuning range and stability," OSA, Optics Express, vol. 18, No. 8, Apr. 12, 2010, 14 pp.

Cohen et al., "Optical coupling to nanoscale optomechanical cavities for near quantum-limited motion transduction," OSA, Optics Express, vol. 21, No. 9 May 1, 2013, 10 pp.

Cohen et al., "Phonon counting and intensity interferometry of a nanomechanical resonator," Macmillan Publishers Limited, Nature vol. 520, Apr. 23, 2015, 4 pp.

Davanco et al., "Slot-mode-coupled optomechanical crystals," OSA, Optics Express, vol. 20, No. 22, Oct. 22, 2012, 17 pp.

Kim et al., "Real-Time Tuning of MEMS Gyro Dynamics," 2005 American Control Conference, FrA06.5, Jun. 8-10, 2005, 6 pp.

Krause et al., "A microchip optomechanical accelerometer," Nature Photonics, vol. 6, No. 11, Mar. 26, 2012, Retrieved from http://arxiv.org/abs/1203.5730, 16 pp.

Pitanti et al., "Strong Opto-Electro-Mechanical Coupling in a Silicon Photonic Crystal Cavity," OSA, Optics Express, vol. 23, No. 3, Feb. 3, 2015.

Trusov et al., "Silicon Accelerometer with Differential Frequency Modulation and Continuous Self-Calibration," 26th International Conference on Micro Electro Mechanical Systems (MEMS), Jan. 20-24, 2013, 4 pp.

Woolf et al., "Optomechanical and Photothermal Interactions in Suspended Photonic Crystal Membranes," OSA, Optics Express, vol. 21, No. 6, Mar. 25, 2013, 18 pp.

Datta et al., "Stress and magnetic field-dependent Young's modulus in single crystal iron-gallium alloys," Journal of Magnetism and Magnetic Materials, vol. 322, Feb. 4, 2010, pp. 2135-2144.

Eichenfield et al., "A picogram- and nanometre-scale photonic-crystal optomechanical cavity," Nature, vol. 459, Letters, May 2009, pp. 550-556.

Siegel et al., "The Variation of Young's Modulus with Magnetization and Temperature in Nickel," Physical Review, vol. 49, May 1, 1936, 9 pp.

\* cited by examiner

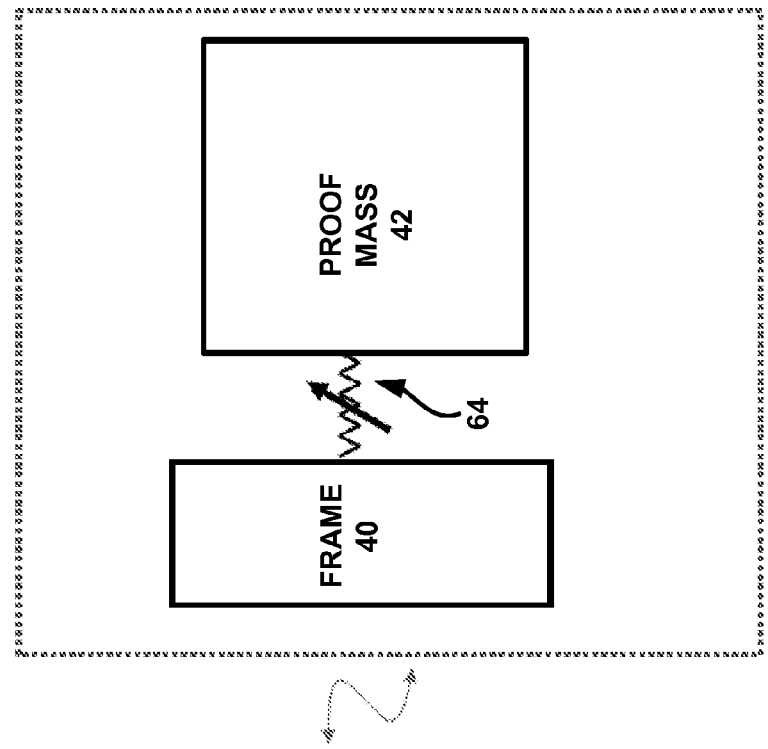
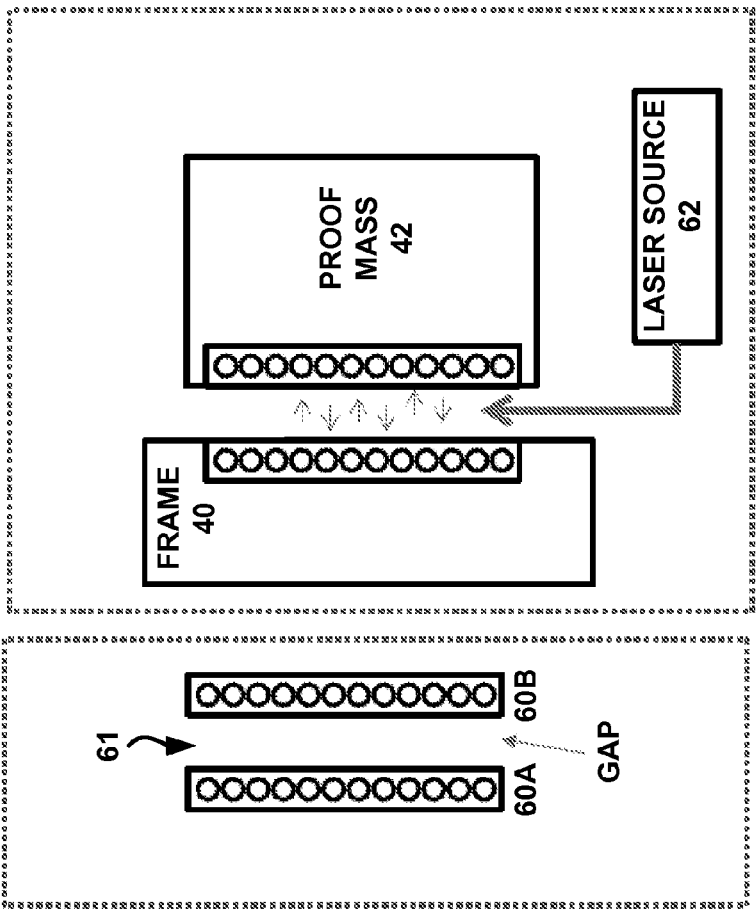
FIG. 4A  FIG. 4B  FIG. 4C

IN-SITU BIAS CORRECTION FOR MEMS ACCELEROMETERS

This Application claims the benefit of

U.S. Provisional Patent Application 62/162,461 filed 15 May 2015, entitled "IN-SITU BIAS CORRECTION FOR MEMS ACCELEROMETERS;"

U.S. Provisional Patent Application 62/186,233 filed 29 Jun. 2015, entitled "OPTICAL-MECHANICAL VIBRATING BEAM ACCELEROMETER;" and U.S. Provisional Patent Application 62/215,677 filed 8 Sep. 2015, entitled "IN-SITU BIAS CORRECTION FOR MEMS ACCELEROMETERS,"

the entire content of each of which is incorporated herein by reference.

TECHNICAL FIELD

This disclosure relates to accelerometers.

BACKGROUND

Some microelectromechanical (MEMS) accelerometers measure acceleration by sensing the inertial forces applied by a proof mass on flexible mechanical anchors. One technique of reading out the force, and therefore the input acceleration, is to measure the displacement of the mass relative to a frame. Another technique is to measure the stress induced in the restoring anchors as they counteract the inertial forces. In some MEMS accelerometers, these measurements are sometimes made by sensing changes in capacitance which communicate the changes in displacement or stress. These changes in capacitance may also be sensed through changes to optical fields. The MEMS accelerometer is typically calibrated once, which occurs in the factory and before use. In the calibration, the output signal of the accelerometer device is measured when the device is subjected to a known acceleration, and the output is corrected to a standard output value.

SUMMARY

This disclosure relates to accelerometers and, more particularly, to devices and methods for calibrating microelectromechanical (MEMS) accelerometers.

In one example, a method of calibrating an accelerometer includes setting a scale factor of the accelerometer to a first value; while the scale factor of the accelerometer is set to the first value, obtaining a first acceleration value; setting the scale factor of the accelerometer to a second value; while the scale factor of the accelerometer is set to the second value, obtaining a second acceleration value; based on the first acceleration value and the second acceleration value, determining a bias correction value; obtaining a third acceleration value; and correcting the third acceleration value based on the bias correction value.

In another example, an accelerometer device includes a proof mass; one or more anchor elements connected to the proof mass; a scale factor control module configured to: set a scale factor of the one or more anchor elements of the proof mass to a first value; set the scale factor of the one or more anchor elements of the proof mass to a second value; a sensing module configured to: while the scale factor of the one or more anchor elements of the proof mass is set to the first value, obtain a first acceleration value; while the scale factor of the one or more anchor elements of the proof mass is set to the second value, obtain a second acceleration value; obtain a third acceleration value; a controller configured to: determine a bias correction value based on the first acceleration value and the second acceleration value; and correct the third acceleration value based on the bias correction value.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 4A-4C show examples of opto-mechanical cavity structures in accordance with examples of this disclosure.

DETAILED DESCRIPTION

Figure 1:
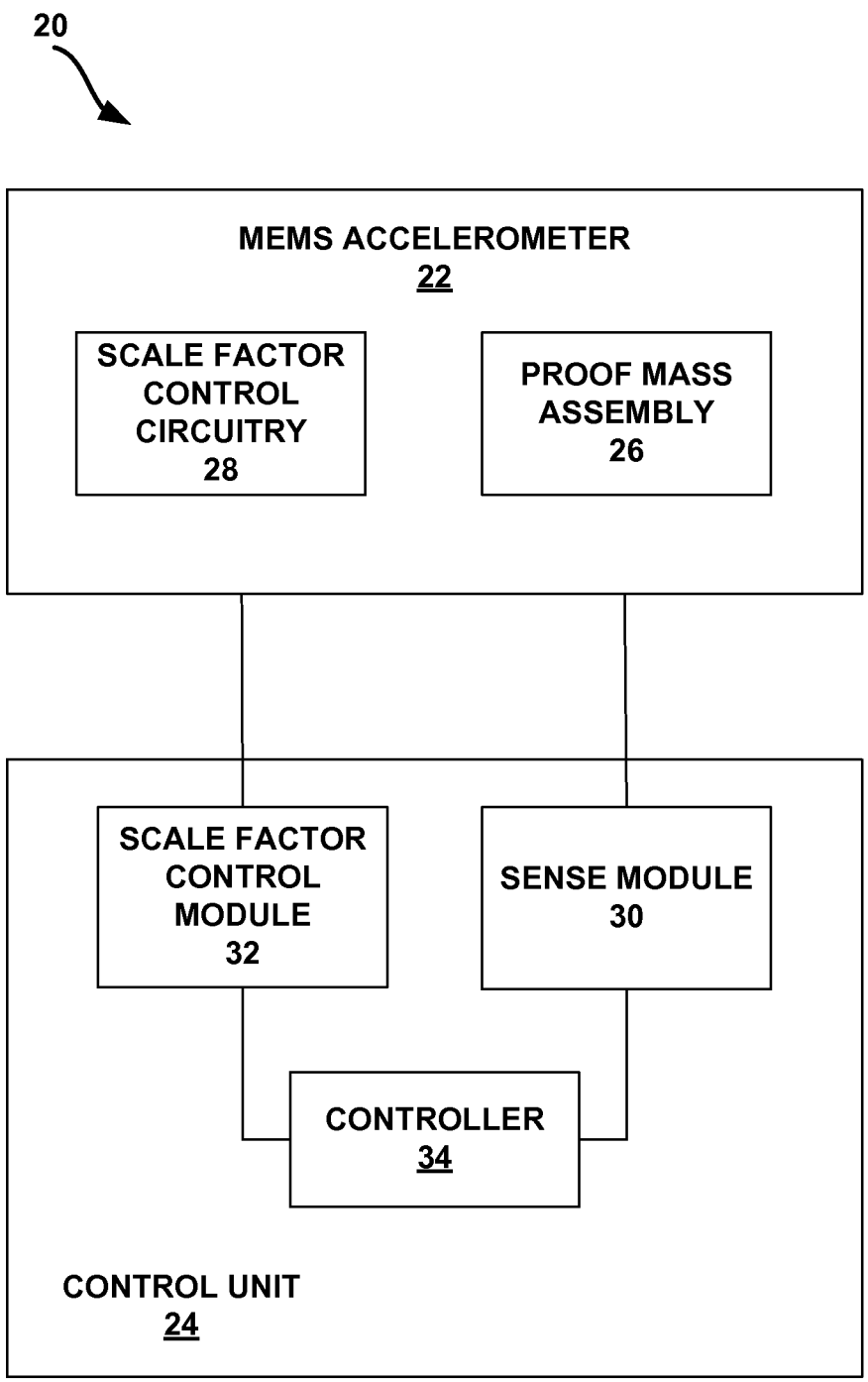
FIG. 1 is a conceptual diagram illustrating an example MEMS accelerometer system, in accordance with examples described herein.

This disclosure relates to accelerometers and, more particularly, to devices, systems, and methods for calibrating microelectromechanical (MEMS) accelerometers. In MEMS displacement accelerometers, the position of a proof mass relative to a frame, in the absence of any acceleration, can shift due to aging of the components of the accelerometers. In a MEMS vibrating beam accelerometer (VBA), the modulus of the beam anchors can change due to weakening or stiffening of the material due to shocks or aging or other mechanisms including a changing environment during operation, such as changing temperature. In both MEMS displacement accelerometers and MEMS VBAs, there may also be significant perturbations to the proof mass position or to the mechanical properties of the anchors due to shocks experienced by the accelerometer while in use. Depending on the application, these shocks may be fairly significant. For example, an accelerometer device implemented in a commercial airplane may experience fairly minor shocks, while an accelerometer device implemented in a missile may experience a relatively more severe shock, and an accelerometer implemented in a projectile fired by a gun may experience an even more severe shock. These shocks can cause the accelerometer output to exhibit an offset, or bias. More severe shocks can cause the accelerometer output to exhibit a larger offset. Additionally, aging can add to this offset due to the structural characteristics of various components of the accelerometer changing with age.

The bias of an accelerometer can be accounted for in an initial (e.g., at factory or before use) calibration process, but in the case of an accelerometer that experiences a shock, particularly a severe shock, the bias may change as a result of the shock while the accelerometer is in use. The bias may also change after the initial calibration due to aging, or due to changing environment, such as changing temperature. This bias, and more specifically this change in bias during use and/or after initial calibration, can severely impact the usability of the accelerometer for certain applications such as inertial guidance mechanisms.

This disclosure describes devices, systems, and techniques that may enable an accelerometer device, such as a MEMS accelerometer, to self-calibrate while in use to account for changes in the functionality of the MEMS accelerometer after initial calibration. For example, this disclosure introduces techniques that may enable an accelerometer device to identify and quantify the portion of an accelerometer output that is "bias" (i.e., the portion of the output not determined by the input accelerations being experienced by the device) as compared to the portion of the accelerometer output that is "signal" (i.e., the portion of the output that responds to the real input accelerations being experienced by the device). By removing the bias from the output, the accelerometer device may provide increased accuracy of acceleration readings compared to non-in-situ calibrating accelerometers and, therefore, offer improved usability.

This disclosure describes devices, systems, and techniques for isolating the bias portion of an accelerometer output from the portion of the output resulting from detected acceleration forces. The scale factor of the accelerometer is the factor (or more generally, function) that establishes the size of the output signal (e.g., an electrical signal in units such as volts) for a given input acceleration experienced by the device.

In a simple model of the accelerometer as a coupled mass-spring system, the scale factor is inversely proportional to the effective spring constant "k" of the anchors that provide the proof mass restoring force. According to one technique of this disclosure, the effective spring constant "k" may be adjustable, such that the scale factor can be set to at least two different values. By increasing the effective k, the scale factor can be made smaller, and by decreasing the effective k, the scale factor can be made larger, for the same proof mass. Control circuitry in the accelerometer may relatively rapidly switch, or sweep, or modulate in a sinusoidal fashion, the scale factor between at least two different values during the time period of a calibration process. By making the switching or sweeping frequency large (e.g. >1000 Hertz (Hz), or higher if necessary) relative to the characteristic Fourier frequencies of interest in the input acceleration signal (in this example, e.g. <50 Hz), control circuitry in the accelerometer device can extrapolate the output to a scale factor of zero, with the intercept of this extrapolation corresponding to the bias of the accelerometer. According to another technique, the scale factor may be continuously and symmetrically (e.g., sinusoidally) modulated at a frequency (f_dither), which causes the genuine input acceleration (e.g., the signal portion excluding the bias) to be upshifted from DC to f_dither, and to be subsequently read-out using standard demodulation techniques (i.e., lock-in detection). Any remaining DC output of the device will be bias.

In some implementations, this calibration process may be performed while the accelerometer is in use. In other words, the accelerometer device may not be restricted to performing the calibration process only in known, controlled environments, but instead, the accelerometer device may be able to perform the calibration process while in operation, e.g., in an uncontrolled acceleration environment and using no equipment or information external to the accelerometer, such as ancillary information about the acceleration environment communicated to the accelerometer by another system.

According to the techniques of this disclosure, a rapid, significant, and controllable modification of the total spring force acting on a MEMS proof mass can be achieved. In one example, an auxiliary, tunable spring may be situated such that the auxiliary, tunable spring partially contributes to the restoring forces on the proof mass. In one example, this tunable spring may be an opto-mechanical cavity in which the optical power circulating in the cavity exerts forces on the walls of the cavity. In the case where one wall of the cavity is part of the proof mass and another wall is part of the frame, the presence of optical power circulating in the optical cavity can, in some circumstances, produce a restoring force on the proof mass. This is often referred to as an "optical spring effect." In the arrangement described, this effect can be used to create an auxiliary, tunable spring, which, acting in parallel with the principal anchors holding the proof mass in place, can create a variable total spring force holding the proof mass in place, and therefore a variable scale factor for sensing accelerations.

An example of an opto-mechanical cavity structure which may be used as an auxiliary, tunable spring is the "zipper opto-mechanical cavity," which is described in Eichenfield, Matt, et al. "A picogram- and nanometer-scale photonic-crystal opto-mechanical cavity" (Nature 459.7246 (2009): 550-555 (28 May 2009)), the entire content of which is incorporated herein by reference. When the optical cavity is coupled to a laser source, the build-up of optical power in the optical cavity can create a relatively large force that can act to keep the gap spacing relatively fixed—the "optical spring effect." Such an arrangement can be used as a tunable spring by positioning the tunable spring in mechanical parallel with the principle anchors. The total effective spring constant is thus a function of the laser power coupled into the cavity. If the laser power is varied, or if the wavelength of the laser is varied so as to vary the strength of coupling of the laser to the resonant cavity, then the optical spring effect can be varied, and the total effective spring constant can be varied, and the scale factor of the accelerometer varied. This works if sufficient optical stiffening can be achieved that the spring constant of the optical cavity $k_{optical\ spring}$ is a significant (for example, between 1%-100%) of the principal spring constant created by the principal anchors, $k_0$.

Another technique for changing the scale factor of the anchors is to make use of the electrostatic stiffening of MEMS flexures, alone or in combination with the other techniques described herein. For examples, the stiffness of MEMS beams can be tuned by applying external stresses using electrostatic (capacitive) actuators. Also, the stiffness of MEMS beams can also be changed by varying the elastic modulus of the beam material itself, which, for metals and metal alloys can be achieved through the application of external magnetic fields, as described in Datta, Supratik, et al. "Stress and magnetic field-dependent Young's modulus in single crystal iron-gallium alloys" (Journal of Magnetism and Magnetic Materials 322.15 (2010): 2135-2144 and Siegel, Sidney, and S. L. Quimby) and "The Variation of Young's Modulus with Magnetization and Temperature in Nickel" (Physical Review 49.9 (1936), 663), the entire content of each of which is incorporated by reference herein.

Another technique for changing the scale factor of the anchors is to adjust the gain of a force rebalance circuit, used, for example, in force rebalance capacitive MEMS accelerometers. In these examples, the effective scale factor providing the restoring force is primarily due to the actuation of a closed-loop proportional-integral-derivative (PID) circuit driving force actuators (e.g., capacitors). Therefore, the scale factor is primarily not due to the intrinsic stiffness of the principal anchors, but, rather, is already controllable by the force rebalance system. In these examples, it may still be accurate to think of the system as having an effective spring constant $k_{effective}$, in so far as the circuit provides a restoring force to the mass that is proportional to the input inertial force.

In some examples, the output of the accelerometer is generally as follows:

$$V_{out} = (a_{in})(dx/da)(dV/dx) + (x_{offset})dV/dx + V_{offset}, \quad (1)$$

where the first term $(a_{in})(dx/da)(dV/dx)$ is the desired output, proportional to the input acceleration, and the last two terms, $(x_{offset})dV/dx$ and $V_{offset}$, are bias terms, which do not depend on the input acceleration. The second to last term, $(x_{offset})dV/dx$, is a bias due to a shift in the proof mass after the last factory calibration. The last term, $V_{offset}$, is a bias due to, for example, electronic offsets, or voltage due to unwanted charge buildup on readout capacitors in a capacitive read-out MEMS accelerometer. In the case of displacement accelerometers, the product $(a_{in})(dx/da) = \Delta x$ leads to a relatively large displacement $\Delta x$ of the proof mass under accelerations. A value of the acceleration is determined by the change the acceleration produces in the position of the proof mass. In the case of a vibrating beam accelerometer, the displacement $\Delta x$ is relatively small, and a value of the acceleration is determined by detecting the change in the stress of the anchors via shifts in the frequency of their internal vibrational modes. In either conformation, if the principal anchors themselves have adjustable spring constants, or if an adjustable spring force deriving from a laser-driven opto-mechanical zipper cavity is placed in mechanical parallel with the principal (non-adjustable) anchors, the scale factor $(dx/da)(dV/dx)$ can be varied, according to this disclosure.

According to some techniques of this disclosure, the value of the second bias term and the third bias terms $(x_{offset})dV/dx$ and $V_{offset}$ of Equation 1 can be ascertained, even while the accelerometer is subject to an unknown, time-dependent input acceleration $a_{in} = a_{in}(t)$, by varying the effective spring constant $k_{effective} = k_0 + k_{adjust}$ rapidly and monitoring the changes in the output voltage. In a simple mass-spring system model, in the linear limit of the accelerometer operation, we have $dx/da = 1/k_{effective}$, where $k_{effective}$ is the effective spring constant providing the elastic mechanical restoring force on the proof mass relative to the frame. If $k_{effective}$ is varied rapidly compared to the time scale over which the input acceleration changes, then, over the calibration time $(t_{cal})$ the first summand of Equation 1 changes only due to the change in $k_{effective}$, and the last two summands will not change at all. The set of values $V1 = V(a_{in}, k_{effective}1)$, $V2 = V(a_{in}, k_{effective}2) \ldots Vn(a_{in}, k_{effective}n)$ can then be used to compute the extrapolated value $V_{extrap} = V(a_{in}, k_{effective} \to \infty)$, which is to zero scale factor, which by construction has only contributions from the two bias terms. Then, this value can be henceforth subtracted from the accelerometer output, providing a bias-free, or approximately bias free, output for subsequent use. The extrapolation will in general be more accurate if $k_{effective}$ can be changed by a large fraction during the procedure.

In another technique, the scale factor of the device is modulated continuously at a frequency $f_{dither}$ that is chosen to be a frequency within the mechanical bandwidth of the mass-spring system, but larger than the largest Fourier component of the input accelerations. This causes the response of the true input acceleration to be up-shifted to the modulation frequency, to be readout by standard demodulation techniques (lock-in detection), whereas the bias component of the output would not be modulated, and is rejected directly.

In one example of a device configured according to the techniques of this disclosure, an accelerometer device includes one or more anchor elements connected to a proof mass and a scale factor control module configured to set a scale factor of the device by modifying mechanical properties of one or more anchor elements of the proof mass to a first value and set the scale factor of the device by modifying mechanical properties of one or more anchor elements of the proof mass to a second value. The accelerometer device also includes a sensing module configured to obtain, while the scale factor of the device is set to the first value, a first acceleration value and to obtain, while the scale factor of the device is set to the second value, a second acceleration value. The accelerometer device also includes a controller configured to determine a bias correction value based on the first acceleration value and the second acceleration value. The sensing module determines a third acceleration value, and the controller corrects the third acceleration value based on the bias correction value.

FIG. 1 is a block diagram of an example MEMS accelerometer system 20 formed in accordance with the techniques of this disclosure. The MEMS accelerometer system 20 includes a MEMS accelerometer 22 and a control unit 24. The MEMS accelerometer 22 includes a proof mass assembly 26 assembly and, scale factor control circuitry 28. The control unit 24 includes a sense module 30 and a scale factor control module 32, both in signal communication with the MEMS accelerometer 22. The control unit 24 also includes a controller 34 in signal communication with the sense module 30 and the scale factor control module 32. In the example of FIG. 1, sense module 30, scale factor control module 32, and controller 34 have been shown separately for purposes of simplifying explanation, but it should be understood that sense module 30, scale factor control module 32, and controller 34 may in fact be highly integrated.

Control unit 24 and the various components of control unit 24 may be implemented as any suitable arrangement of hardware, software, firmware, or any combination thereof, to perform the techniques attributed to control unit 24. For example, control unit 24 may include any of one or more microprocessors, digital signal processors (DSPs), application specific integrated circuits (ASICs), field programmable gate arrays (FPGAs), or any other equivalent integrated or discrete logic circuitry, as well as any combinations of such components. Control unit 24 may additionally include memory and other components.

Figure 2A:
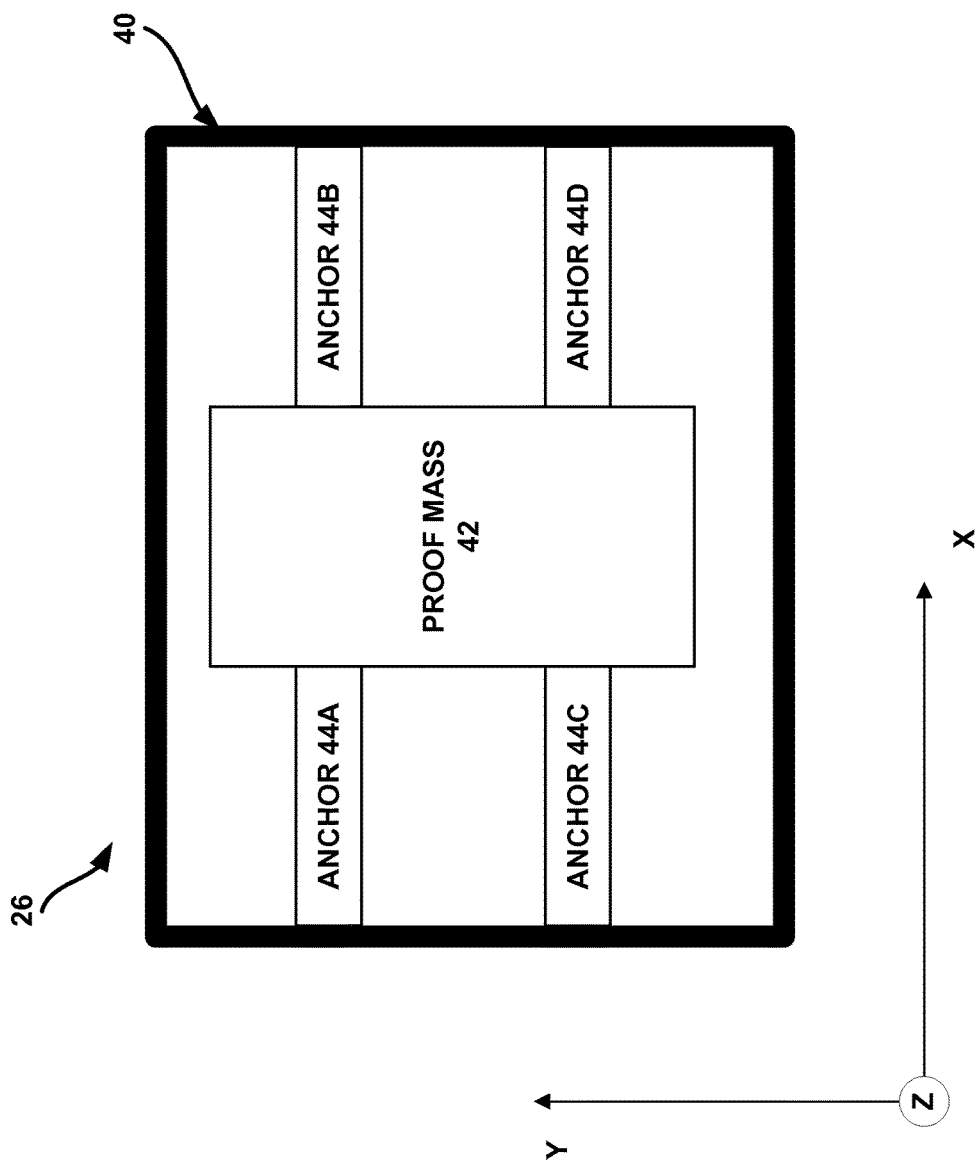
FIGS. 2A-2C are conceptual diagrams illustrating an example proof mass assembly, in accordance with examples described herein.

FIG. 2A is a block diagram of an example proof mass assembly 26 of FIG. 1. Proof mass assembly 26 includes frame 40, proof mass 42, and anchors 44A-44D (collectively, "anchors 44"). Anchors 44 may also be referred to as anchor elements, flexures, flexure elements, or other such terms. Frame 40 may also be referred to as a base or other such term. Anchors 44 connect proof mass 42 to frame 40. Proof mass assembly 26 may be configured to operate either in-plane or out-of-plane.

Figure 2C:
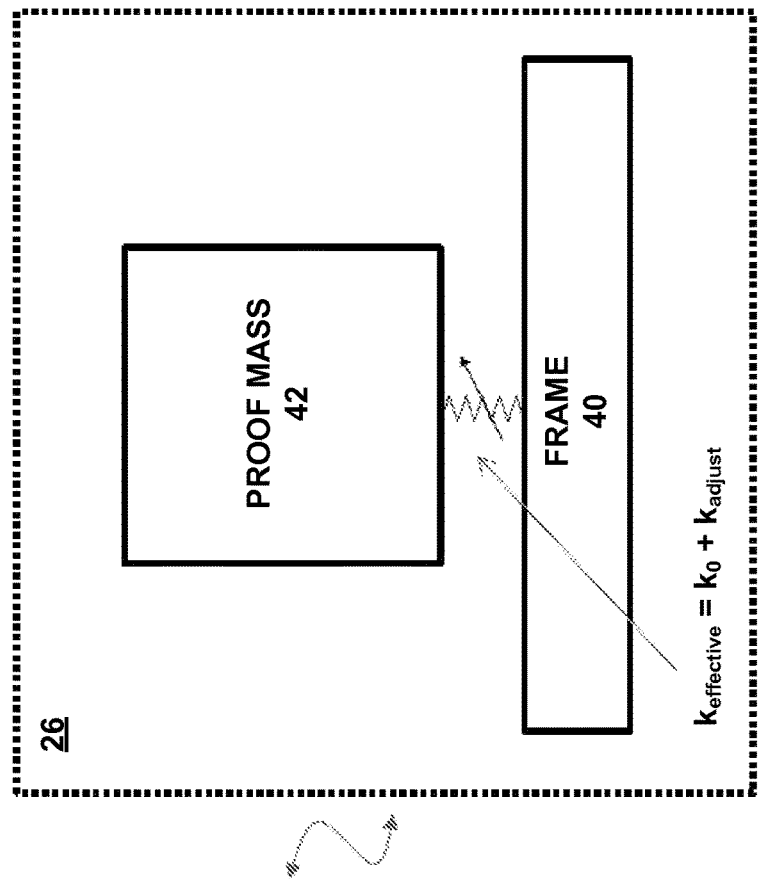
Figure 2B:
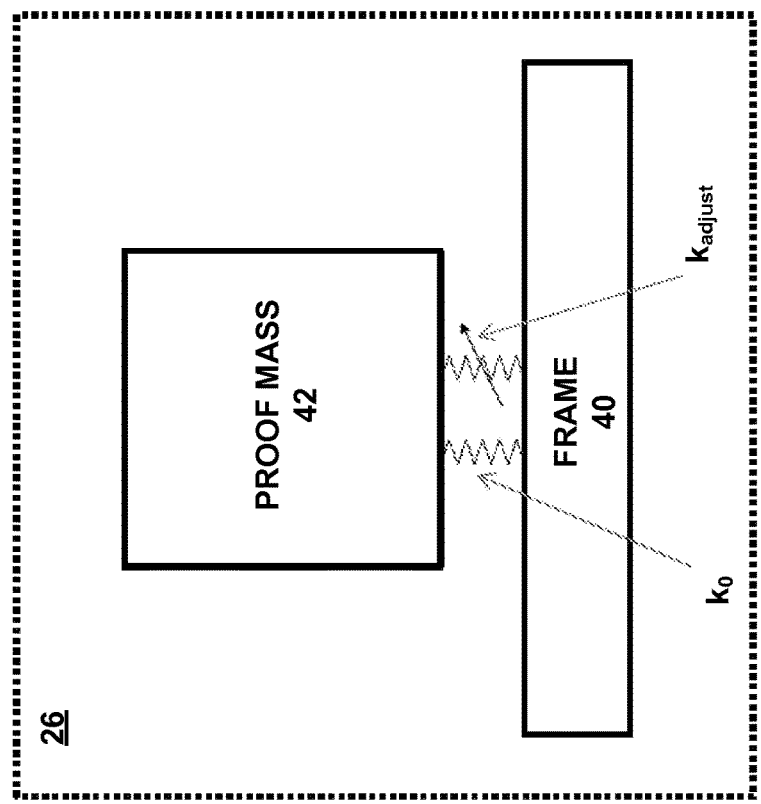

FIGS. 2B and 2C show alternative views of proof mass assembly 26 of FIGS. 1 and 2A. As introduced above, this disclosure describes techniques for rapid, significant, and controllable modification of the total spring force acting on a MEMS proof mass, such as proof mass 42. As shown in FIGS. 2B and 2C, proof mass 42 is connected to frame 40 by anchors (including anchors 44), which are configured to apply a restoring force to proof mass 42 in the presence of inertial forces. Anchors 44 have a spring constant ($k_0$). In some examples of the techniques of this disclosure, scale factor control circuitry 28 may be configured to modify the spring constant of anchors 44, thus introducing an adjustable component ($k_{adjust}$) into the total spring force ($k_{effective}$) applied by anchors 44 on proof mass 42. In this example, k0 corresponds to the unmodified spring constant of anchors 44. In other examples, rather than modifying the total spring force applied by anchors 44, scale factor control circuitry may be configured to produce an auxiliary spring force. Thus, in these other examples, the adjustable portion ($k_{adjust}$) of the total spring force corresponds to the auxiliary spring force. FIG. 2B conceptually shows $k_0$ and $k_{adjust}$ as separate restoring force, while FIG. 2C illustrates the point that $k_0$ and $k_{adjust}$ may also be viewed together as a single restoring force.

As will be explained in greater detail below, scale factor control circuitry 28 may take several forms, and thus may modify the total spring force (e.g., $k_{effective}$ in FIGS. 2B and 2C) acting on proof mass 42 in a variety of different manners. In one example, scale factor control circuitry 28 may be a laser source, which includes, among other possible components, a laser and external amplitude modulators, photodetectors, waveguides, and other photonic components, in the form of, for example, a photonics integrated circuit. In other examples, scale factor control circuitry 28 may include one or more of force rebalance circuitry, electrostatic field generation circuitry, and magnetostatic field generation circuitry.

Referring back to FIG. 2A, in an in-plane configuration, anchors 44 are relatively rigid in the z-axis direction (i.e. in and out of the page) but are configured to allow proof mass 42 to move in the x-axis and y-axis directions relative to frame 40 in the presence of inertial forces. Orthogonal x-y axes are shown in FIG. 2A for ease of description only. By contrast, in an out-of-plane configuration, anchors 44 are relatively rigid in the x-axis and y-axis directions but are configured to allow proof mass 42 to move in the z-axis direction relative to frame 40 in the presence of inertial forces. Although FIG. 2A shows four anchors, it should be understood that the techniques of this disclosure may be implemented in systems with more or fewer anchors. As one example, proof mass assembly 26 may implemented with only two anchors, such as only 44A and 44C or only 44B and 44D.

Regardless of whether proof mass assembly 26 is in-plane or out-of-plane, sense module 30 of FIG. 1 may be configured to measure an acceleration experienced by proof mass assembly by detecting the displacement of proof mass 42 under inertial forces. Sense module 30 may, for example, detect the displacement of proof mass 42 using a capacitive pick-off system (not shown in FIG. 1 or FIGS. 2A-2C). In such an example, a capacitor plate may be deposited on a surface of proof mass 42, and a similar capacitor plate may be deposited elsewhere in proof mass assembly 26. Under inertial forces, the distances between the capacitive plates, and thus the capacitance, changes. By measuring this change in capacitance, controller 34 may calculate an acceleration.

Alternatively, the anchors retaining the proof mass are sufficiently stiff that the proof mass displacement is virtually zero, and the acceleration is sensed by sensing changes in the internal vibrational frequencies of the anchor beams. In the standard technique of vibrating beam accelerometers, the changes in the mechanical frequency of the vibrating modes of the anchors can be detected by resonantly driving those modes, and sensing the resonant response, using capacitive readout to drive and sense the vibrational mode, but other read-out modalities, such as optical sense and drive, are possible.

Additionally or alternatively, a force-rebalancing system (not shown in FIG. 1 or FIGS. 2A-2C) may be used to detect the displacement of proof mass 42. In such a system, force-rebalance capacitors cooperate with a suitable feedback circuit to retain the proof mass at a predetermined position (i.e., a null position) with respect to the support structure. Thin film leads on the surface of the accelerometer may provide electrical connections to the capacitor pick-off plates and force rebalance coils. Acceleration applied to MEMS accelerometer system 20 may be determined by controller 34 based on the change in capacitance with respect to the capacitor plates or the voltage increase in the force-rebalance capacitors to maintain the proof mass in the null position. It should be understood that capacitive pickoff and force rebalancing are merely two examples of how displacement of proof mass 42 may be detected, and that the techniques of this disclosure are not limited to any particular types of displacement detection techniques.

According to the techniques of this disclosure, MEMS accelerometer system 20 may be configured to perform in-situ bias correction by performing a calibration process while in use (e.g. while experiencing inertial forces). As will be explained in more detail below, as part of the calibration process, scale factor control module 32, in conjunction with scale factor control circuitry 28, may be configured to change scale factors by modifying the spring constants of one or more of anchors 44 or by adding auxiliary springs. In examples in which scale factor control circuitry 28 modifies the scale factor of anchors 44, then the overall scale factor for the device becomes the modified scale factor. In examples in which scale factor control circuitry 28 adds an auxiliary spring, then the overall scale factor for the device becomes a combination of the scale factors of anchors 44 and the scale factor of the auxiliary spring.

Using techniques that will be explained in greater detail below, scale factor control circuitry 28, under the control of scale factor control module 32, sets a scale factor of anchors 44 of proof mass assembly 26 to a first value (e.g., by modifying spring constants of one or more of anchors 44 or by adding auxiliary springs). While the scale factor of anchors 44 is set to the first value, sense module 30 obtains a first reading of an acceleration value. Scale factor control circuitry 28, under the control of scale factor control module 32, sets a scale factor of anchors 44 of proof mass assembly 26 to a second value (e.g., by modifying spring constants to a different constant than when for the first value or by adding more or fewer auxiliary springs as compared to for the first value). While the scale factor of anchors 44 is set to the second value, sense module 30 obtains a second reading of an acceleration value. Based on the first reading of the acceleration value and the second reading of the acceleration value, controller 34 determines a bias correction value.

Once controller 34 determines a bias correction value for MEMS accelerometer system 20, controller 34 may correct future acceleration readings based on the determined bias correction value. For example, sense module 30 may determine a third reading of an acceleration value, and controller 34 may correct the third reading of acceleration value based on the bias correction value. Controller 34 may, for instance, correct the third reading of the acceleration value by subtracting the bias correction value from the third reading of the acceleration value.

Figure 3A:
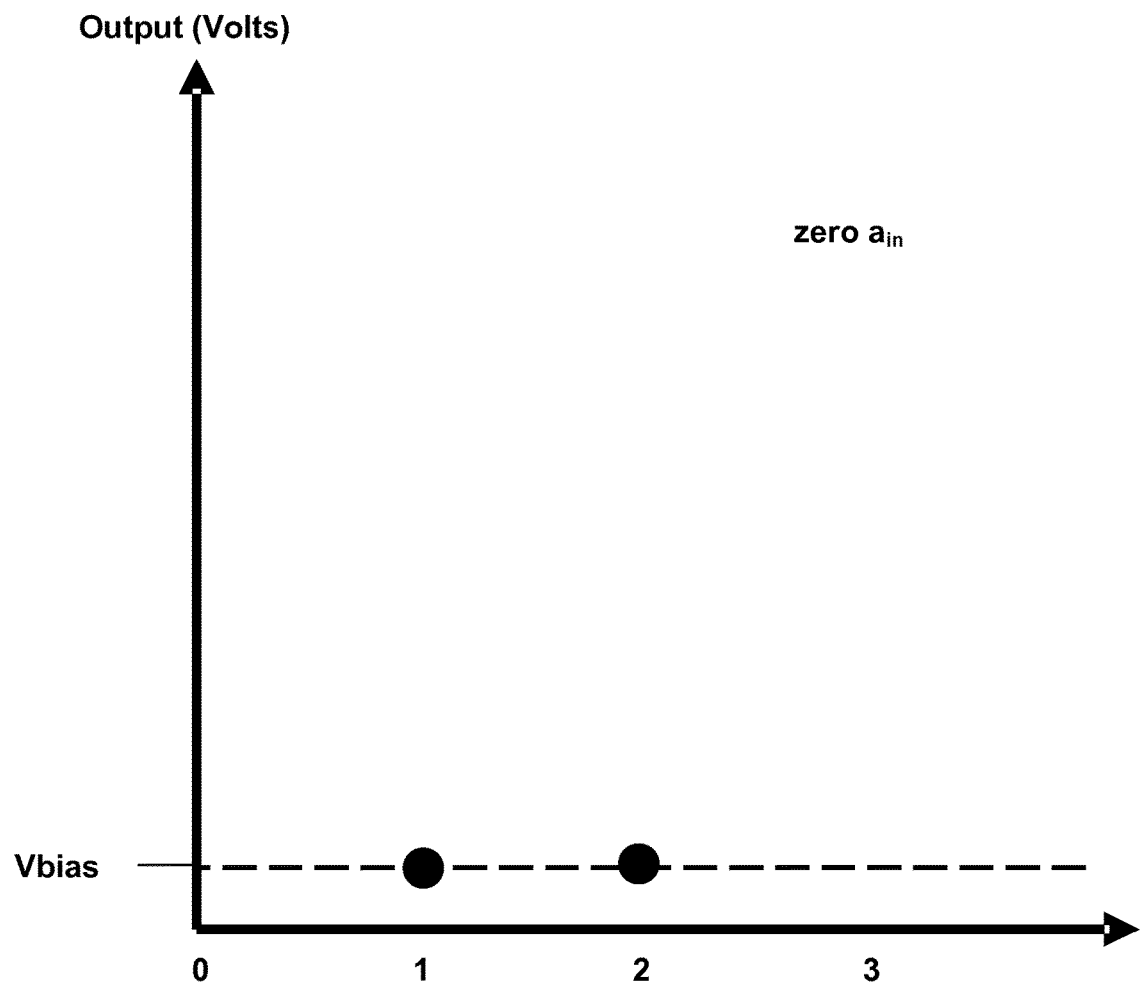
FIGS. 3A-3C show three examples of a linear extrapolation for determining a bias value of a MEMS accelerometer system in accordance with examples of this disclosure.
Figure 3B:
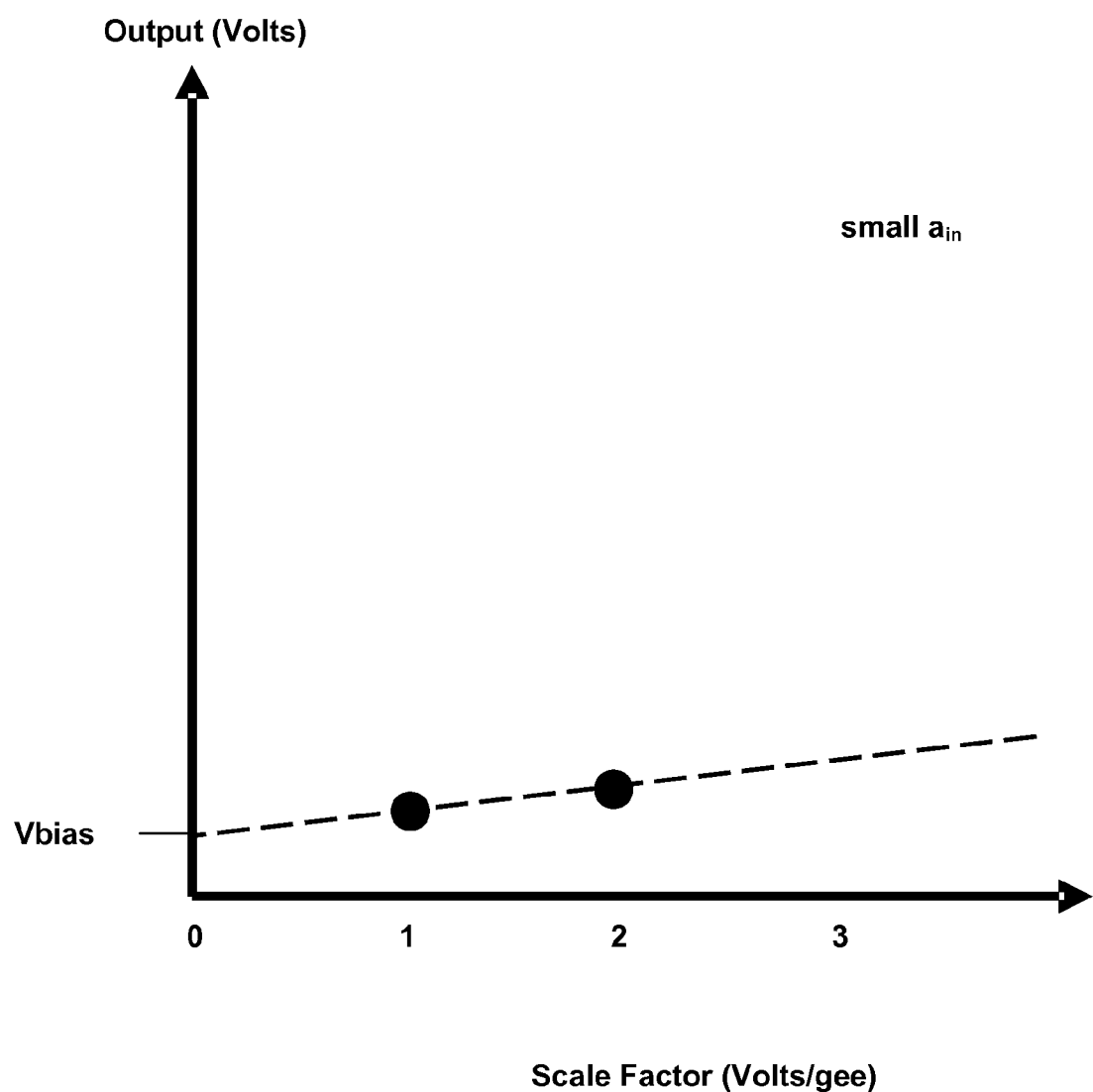
Figure 3C:
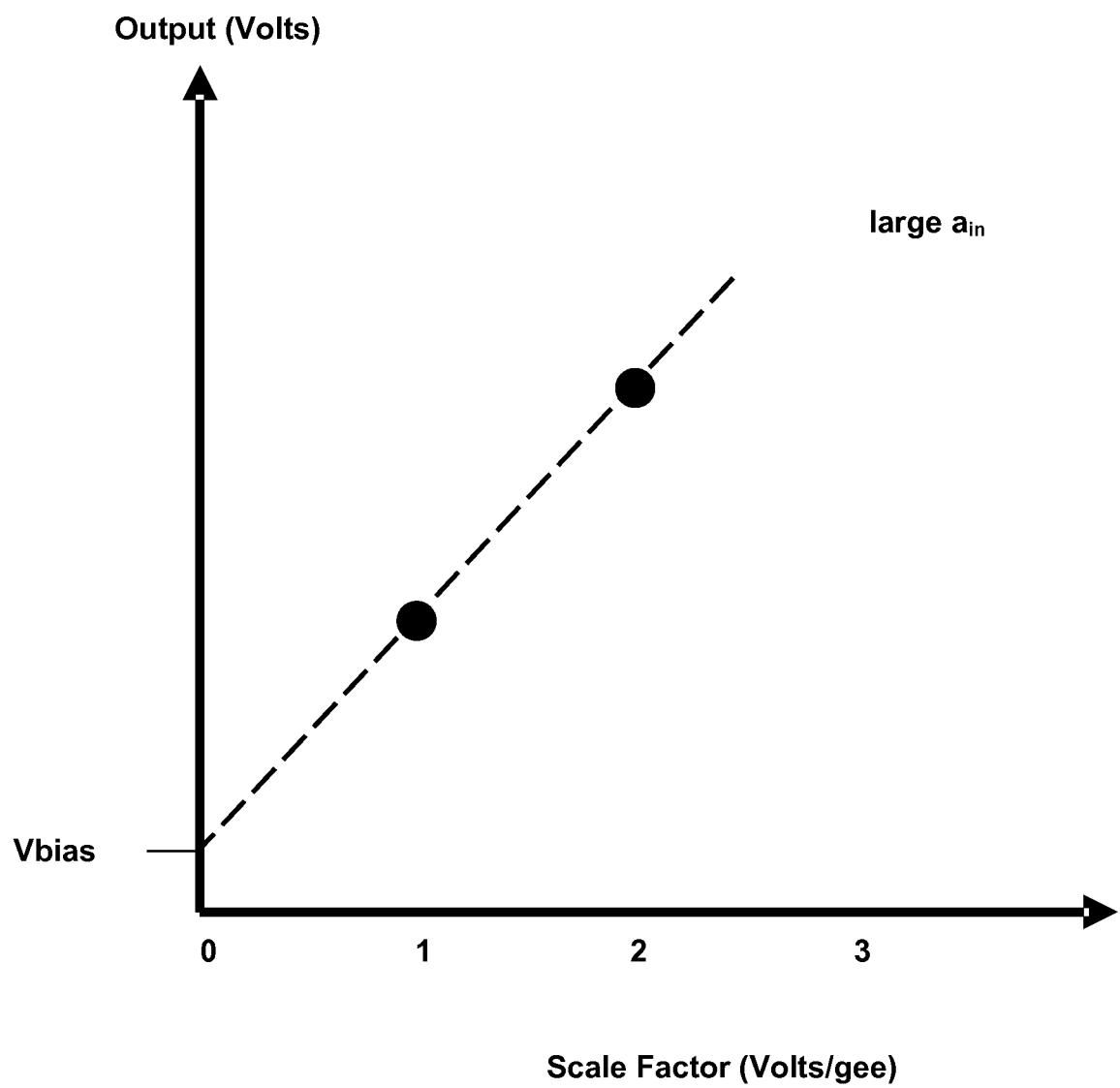

FIGS. 3A-3C show three examples of a linear extrapolation to a zero scale factor (i.e., $k_{effective} \rightarrow \infty$). The techniques described in FIGS. 3A-3C may, for example, be implemented by controller 34 of MEMS accelerometer system 20 to determine a bias correction value. The techniques described with respect to FIGS. 3A-3C are generally applicable to all the various implementations of scale factor control circuitry 28 described in this disclosure. In each of the examples of FIGS. 3A-3C, the accelerometer output is measured at two values of the scale factor, for example, for the scale factors 1V/gee and 2V/gee. FIG. 3A shows an example where $V(a_{in})$ is small compared to the bias. For example, the true acceleration in a given direction may be $a_{in}$=20 microgee (i.e. $20 \times 10^{-6}$ g, where g represents the gravitational constant) if the object is drifting in space, subject only to small atmospheric drag, whereas the bias may be 100 microgee. FIG. 3B shows an example where $V(a_{in})$ is large compared to the bias. For example, the true acceleration may be $a_{in}$=1 gee if the object is in free fall, whereas the bias may be 100 microgee. FIG. 3C shows an example where $a_{in}$ is zero, such as if the object is at rest, whereas the bias is 100 microgee. In each case, the unique bias is identified by the extrapolation to zero scale factor, even for different values of the input acceleration.

The accuracy of the extrapolation may depend on the signal-to-noise of each measurement, the number of measurements, and the degree to which the scale factor can be varied during the measurement. For example, if the accelerometer has an equivalent white noise of 30 microgee/rtHz, and if the scale factor could be modulated from its full value to ~zero, and if only the two external points of full and ~zero scale factor are used in the extrapolation, then the bias could be determined to $30/\sqrt{2}$ microgee in 1 second. For purposes of simplicity, FIGS. 3A-3C show two measurements each. It should be understood, however, that additional, or different, measurements may also be used. In the examples of FIGS. 3A-3C, the bias is the intercept of the extrapolated line with the vertical axis, which corresponds to the voltage output of the accelerometer with zero scale factor.

In the hypothetical scenarios depicted in FIGS. 3A-3C, the bias is the same in each scenario, and is correctly identified even as the external real accelerations acting on the frame are changed between scenarios. It should be noted that the bias can be measured in this way even for an unknown input acceleration, as long as the acceleration is constant over the calibration time, meaning the scale factor is varied, or modulated, rapidly as compared to the time scale at which the input acceleration is changing significantly. It is essential that the changes in scale factor are to be effected by modifying the effective spring constant of the total system of anchor(s) 44A-D constraining proof mass 42 to its equilibrium position; and not, for example, by a mere change in the electronic amplification of the voltage output.

In examples in which the scale factor is stepped between one or more values, rapidly, and the output detected at each step, the scale factor control circuitry 28 sets the accelerometer scale factor to a first value, and sense module 30 may obtain a first reading of the acceleration value. Scale factor control module 32 may then modify the one or more parameters of scale factor control circuitry 28 to set the scale factor to a second value. For example, scale factor 1 could be 2V/gee, and scale factor 2 could be 1V/gee. While the scale factor of the one or more anchor element(s) of proof mass assembly 26 is set to the second value, sense module 30 may obtain a second reading of an acceleration value. Based on the first reading of the acceleration value and the second reading of the acceleration value, controller 34 may determine a bias correction value. Controller 34 may, for example, determine the bias correction value by extrapolating, based on the first reading of the acceleration value and the second reading of the acceleration value, the reading which would correspond to a scale factor value of zero, even if the scale factor cannot be set to zero.

According to other examples, scale factor control circuitry 28, under the control of scale factor control module 32, may adjust the scale factor by changing mechanical properties of anchors 44. Scale factor control circuitry 28 may, for example, apply electric or magnetic fields across anchors 44 by way of coils or electrodes. Under the control of controller 34, electrostatic or magnetostatic fields are applied to the principal anchors to change their mechanical modulus. Additionally or alternatively, scale factor control circuitry 28 may direct laser light at the opto-mechanical cavities, causing an optical-spring force to arise between the sides of the cavity, which creates an optically tunable spring force acting in parallel with the principal anchors. Scale factor control module 32 may control parameters associated with the laser light. Various examples of both changing mechanical properties of anchors 44 and controlling an optical-spring force will be described in more detail below.

FIG. 4A shows an example of an opto-mechanical cavity structure, which forms a "zipper" photonic crystal optical cavity that may be used as an auxiliary, tunable spring in accordance with examples introduced above. The opto-mechanical structure of FIG. 4A includes two photonic crystal MEMS beams 60A and 60B separated by a gap, which forms opto-mechanical cavity 61. Opto-mechanical cavity 61 may have a relatively high mechanical-Q factor, meaning opto-mechanical 61 exhibits low mechanical energy loss per oscillation cycle relative to the energy stored in a mechanical mode. Additionally, opto-mechanical cavity 61 may have a relatively high optical-Q factor, meaning opto-mechanical cavity 61 exhibits low optical energy loss per oscillation cycle relative to the energy stored in an optical mode. FIG. 4B shows the opto-mechanical cavity of FIG. 4A coupled to laser source 62. Laser source 62 may, for example, be part of scale factor control circuitry 28. Laser source 62 may direct laser power into the cavity formed by the beams 60A-B causing optical power to circulate in the opto-mechanical cavity 61. The build-up of optical power in the opto-mechanical cavity 61 can create a force that acts to keep the gap spacing relatively fixed, creating an "optical spring effect."

FIG. 4C is a conceptual diagram showing the opto-mechanical structure of FIG. 4B replaced with tunable spring 64. Tunable spring 64 in FIG. 4C is intended to represent a model of how photonic crystal MEMS beams 60A and 60B behave when optical power is directed into the gap between photonic crystal MEMS beams 60A and 60B. Tunable spring 64 has a tunable spring constant ($k_{optical\ spring}$), which is a function of the laser power directed into the zipper opto-mechanical cavity.

In the examples of FIGS. 4A-4C, scale factor control module 32 may adjust one or more parameters of laser source 62 to modify the strength of the optical spring effect. Scale factor control module 32 may, for example, change the intensity of the laser of laser source 62 by means of amplitude modulation or changing the frequency of the laser by adjusting the current supplied to the laser (in, for example, the case the laser source is a diode laser). By modifying one or more parameters of laser source 62, scale factor control module 32 may vary the power and/or frequency of the laser energy coupling into the opto-mechanical cavity. As one example, scale factor control circuitry 28 may change the power of laser light from 0 to 100 uW by tuning the amplitude of the laser over this range. As another example, the laser power coupled into the opto-mechanical cavity 61 may be changed by modifying the position of evanescent waveguides carrying the laser light from the laser source to the optical cavity by an amount of 1-4 microns in the out of plane direction. In some cases, it may be necessary to lock the frequency of the laser to the optical cavity, which would also be performed by the laser controller shown, using standard techniques of optical spectroscopy. By adjusting the frequency of the laser, the laser may be tuned to a frequency that is one half of an optical linewidth higher than, or lower than, the resonant optical frequency of opto-mechanical cavity 61, which modifies the strength and sign of the optical spring effect. By modifying the amount of power coupled into the opto-mechanical cavity, or the frequency of the laser being coupling in the opto-mechanical cavity, the scale factor control module 32 may modify the optical spring forces applied to the proof mass, and thereby change the total effective spring constant of the mechanical forces constraining the proof mass to its equilibrium position in the frame, by, for example, 20% for nanogram proof masses and laser powers of 100 uW, and opto-mechanical zipper cavities with Q_mechanical of 1E6 and Q_optical of 1E6.

In the case of optical control, scale factor control module 32 may, for example, change the optical spring forces in the auxiliary cavities by changing the laser power coupled into the cavity from the laser. This may be accomplished by reducing or increase the power emitted by the laser, by reducing or increasing the current driving the laser diode, in the case a laser diode is used as the source. Assuming the laser frequency is kept resonant with the opto-mechanical cavity optical resonance, and other coupling factors are kept the same, the optical spring force exerted across the sides of the zipper cavity is proportional to the amplitude of the driving laser, so a change in amplitude of the laser by 10% would change the optical spring effect forces applied by the opto-mechanical cavity to the proof mass by 10%. Since this cavity is applying a force to the proof mass in parallel with the forces applied by the principal anchors, the total restoring forces applied to the proof mass is varied according to $$k_{effective}=k_0+k_{adjustible}, \text{ where } k_{adjustible}=k_{optical\ spring}.$$

In this way, the effective spring constant holding the proof mass in place can be modified by changing the power emitted by the drive laser.

Additionally or alternatively scale factor control module 32 may be modified by changing the wavelength of the laser source relative to the optical resonance of the opto-mechanical zipper cavity. When the laser is lower in frequency relative to the optical resonance, the optical spring effect is such that $k_{optical\ spring}>0$, and the magnitude of the force varies with detuning around the half-linewidth point, where it is maximal at the half linewidth point. When the laser is higher in frequency relative to the optical resonance, the optical spring effect is such that $k_{optical\ spring}<0$, and the magnitude of the force varies with detuning around the half-linewidth point, where it is maximal at the half linewidth point. When the laser is on resonance with optical resonance, the optical spring effect vanishes. In the case that thermal effects cause the cavity to mistune when the laser power coupled into the cavity changes, the laser may need to actively track the resonance of the cavity, using standard laser locking techniques. Since this cavity is applying a force in parallel with the principal anchors, the total spring is varied according to $$k_{effective}=k_0+k_{adjustible}, \text{ where } k_{adjustible}=k_{optical\ spring}.$$

In this way, the effective spring constant holding the proof mass in place can be modified by changing the frequency of the laser coupling power into the zipper opto-mechanical cavity.

Additionally or alternatively, scale factor control module 32 may adjust the geometry of the optical pathway by which the laser produced by laser source 62 is coupled to the opto-mechanical cavity 61. For example, if the waveguide which couples the laser light from the laser source to the opto-mechanical cavity is displaced by 1 to 2 microns from the optimal position, the optical power coupled into the cavity may be strongly reduced, as this coupling depends exponentially on the distance between the waveguides, with a characteristic length scale of 100's of nanometers, the lateral dimensions of the waveguide. Thus, a change in the relative position of the coupling waveguides of ~1 micron could change the restoring force applied by the optical cavity by ~100%. Since this cavity is applying a force in parallel with the principal anchors, the total spring is varied according to $k_{effective}=k_0+k_{adjustible}$, where $k_{adjustible}=k_{optical\ spring}$. In this way, the effective spring constant holding the proof mass in place can be modified by changing the mechanical position of the waveguide structure coupling the laser source to the opto-mechanical cavity.

Figure 5:
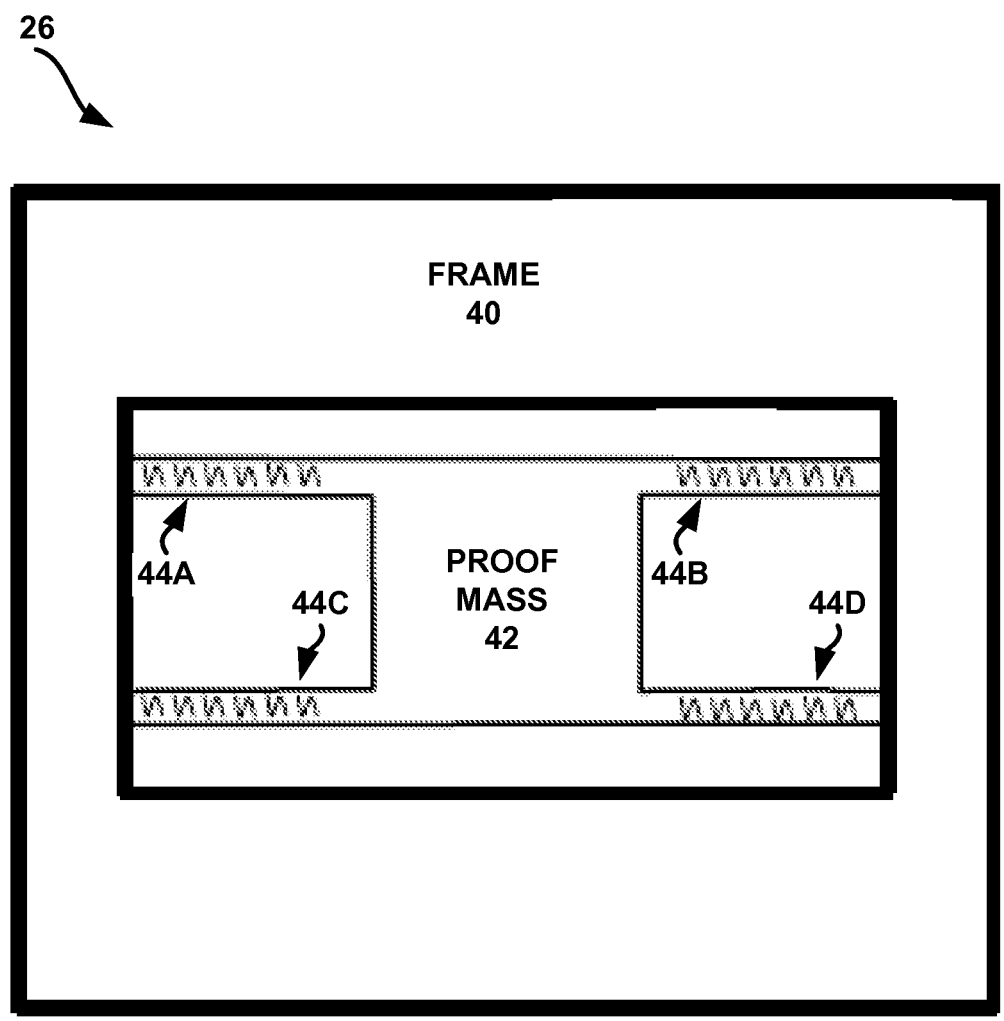
FIG. 5 shows a proof mass assembly in accordance with examples of this disclosure.

FIG. 5 shows an alternative view of proof mass assembly 26. The configuration of proof mass assembly 26 shown in FIG. 5 may, for example, be implemented into MEMS accelerometer system 20 of FIG. 1. In such an implementation, anchors 44 may be made of a metamaterial, and scale factor control circuitry 28, under the control of scale factor control module 32, may direct electric or magnetic fields at anchors 44 in order to modify an elastic modulus of the material. By modifying the elastic modulus of the materials of anchors 44, scale factor control module modifies the total effective spring constant of the restoring force between proof mass 42 and frame 40.

Figure 6:
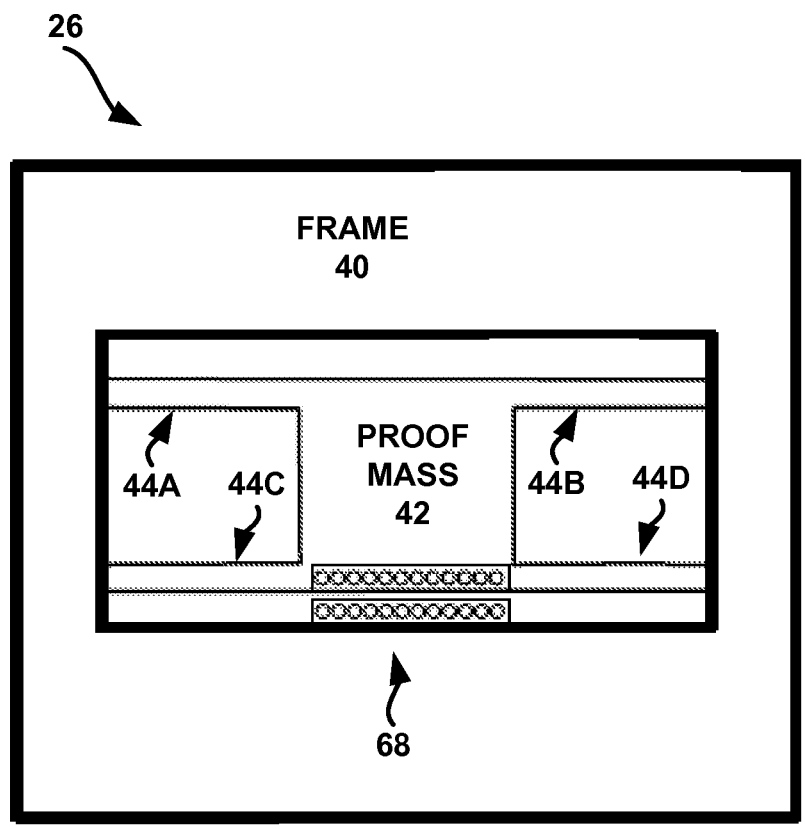
FIG. 6 shows another proof mass assembly in accordance with examples of this disclosure.

FIG. 6 shows another example of proof mass assembly 26. The configuration of proof mass assembly 26 shown in FIG. 6 may, for example, be implemented into MEMS accelerometer system 20 of FIG. 1. Proof mass assembly 26 includes opto-mechanical cavity 68. Opto-mechanical cavity 68 acts as an adjustable spring when driven by a laser source, such as laser source 62 of FIG. 4B. The adjustable spring of opto-mechanical cavity 68 is in mechanical parallel with anchors 44. Thus, scale factor control circuitry 28, under the control of scale factor control module 32, can modify the total effective spring constant between proof mass 42 and frame 40 by modifying the spring constant of opto-mechanical cavity 68.

Figure 7:
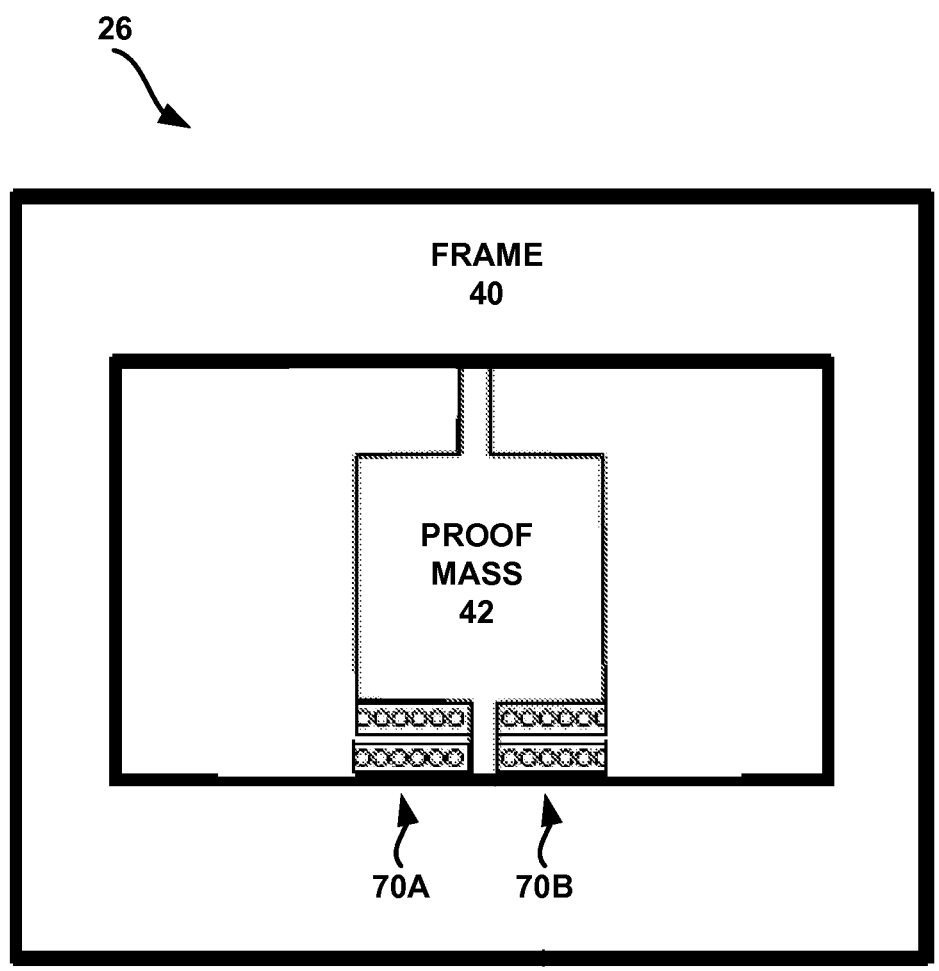
FIG. 7 shows another proof mass assembly in accordance with examples of this disclosure.

FIG. 7 shows another example of proof mass assembly 26. The configuration of proof mass assembly 26 shown in FIG. 7 may, for example, be implemented into MEMS accelerometer system 20 of FIG. 1. Proof mass assembly 26 includes opto-mechanical cavity 70A and 70B. Opto-mechanical cavities 70A and 70B act as an adjustable spring when driven by a laser source, such as laser source 62 of FIG. 4B. The adjustable optical spring effect forces of the opto-mechanical cavity 68 are in mechanical parallel with anchors 44. Thus, scale factor control circuitry 28, under the control of scale factor control module 32, can modify the total effective spring constant between proof mass 42 and frame 40 by modifying the optical spring effect of opto-mechanical cavities 70A and 70B. FIG. 7 shows a VBA configuration that may be used in conjunction with a VBA accelerometer, such as optical-mechanical vibrating beam accelerometer 100 described in FIG. 10 below.

Figure 8:
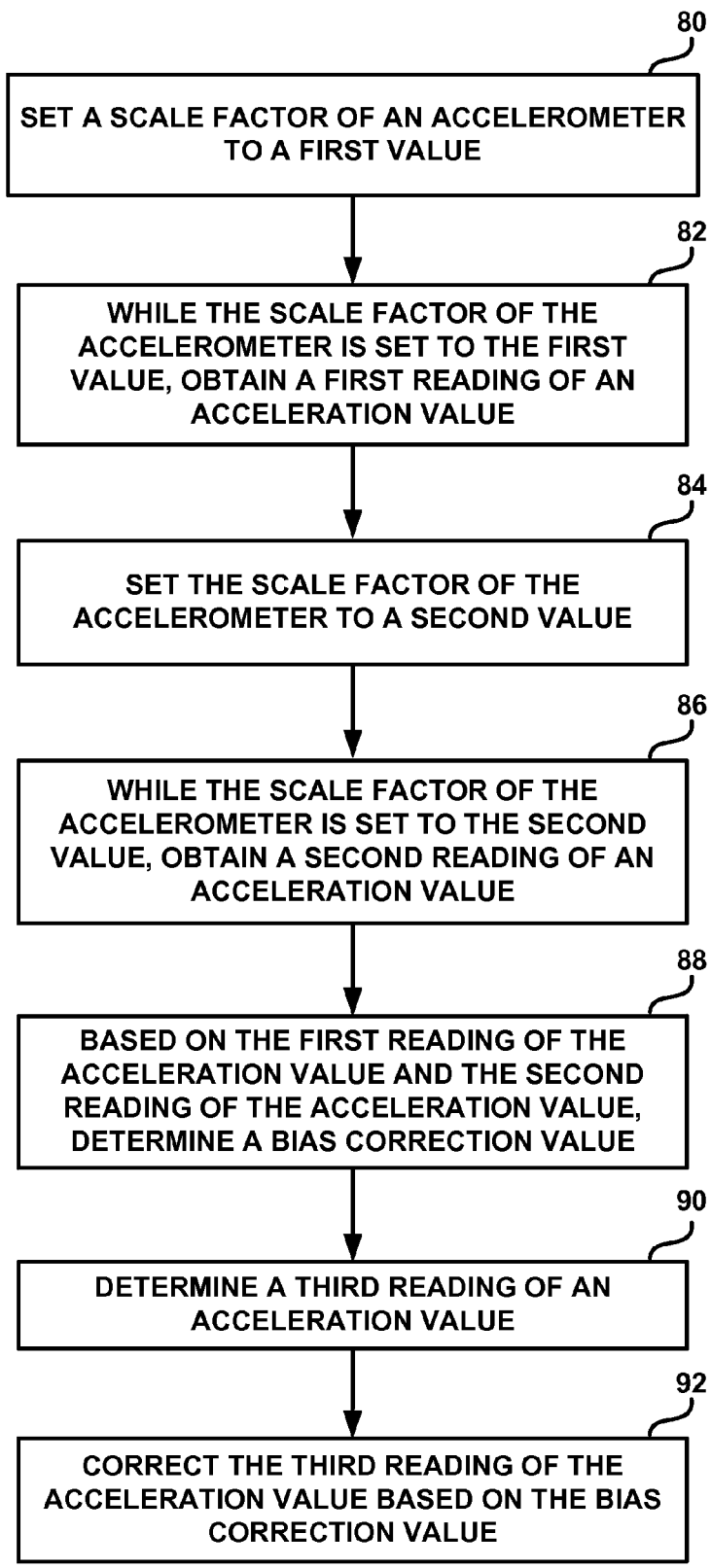
FIG. 8 is a flowchart illustrating a method of calibrating an accelerometer according to the techniques of this disclosure.

FIG. 8 is a flowchart illustrating an example method of calibrating an accelerometer according to examples of this disclosure. The techniques of FIG. 8 will be described with respect to MEMS accelerometer system 20, but it should be understood that the techniques of FIG. 8 may also be performed by other types of MEMS accelerometer systems. In the example of FIG. 8, MEMS accelerometer system 20 sets the scale factor of the accelerometer to a first value by setting the effective spring constant holding the proof mass in the frame to a first value (80). While the scale factor of the accelerometer is set to the first value MEMS accelerometer system 20 obtains a first reading of an accelerometer output. (82). MEMS accelerometer system 20 sets the scale factor of the accelerometer to a second value by setting the effective spring constant holding the proof mass in the frame to a second value (84). While the scale factor of the accelerometer is set to the second value MEMS accelerometer system 20 obtains a second reading of the accelerometer output (86). Based on the first reading of the accelerometer output and the second reading of the accelerometer output, MEMS accelerometer system 20 determines a bias correction value (88). MEMS accelerometer system 20 obtains a third reading of the accelerometer output (90) and corrects the third reading of the accelerometer output based on the bias correction value (92).

Figure 9:
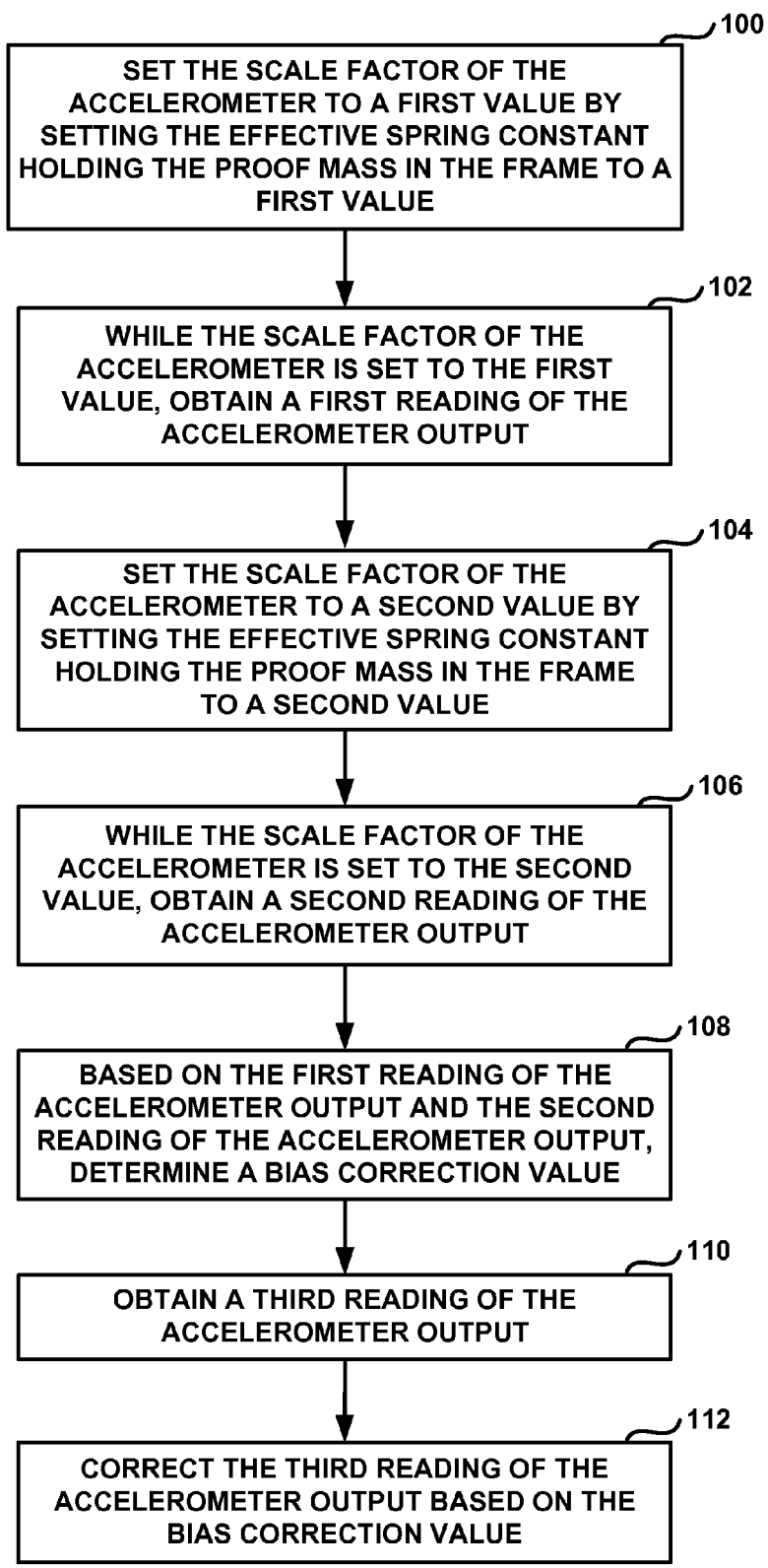
FIG. 9 is a flowchart illustrating a method of calibrating an accelerometer according to the techniques of this disclosure.

FIG. 9 is a flowchart illustrating an example method of calibrating an accelerometer according to examples of this disclosure. The techniques of FIG. 9 will be described with respect to MEMS accelerometer system 20, but it should be understood that the techniques of FIG. 9 may also be performed by other types of MEMS accelerometer systems. In the example of FIG. 9, scale factor control module 32 and scale factor control circuitry 28 set a scale factor of MEMS accelerometer system 20 to a first value by setting the effective spring constant holding proof mass 42 in frame 40 to a first value (100). While the scale factor of the MEMS accelerometer system 20 is set to the first value, sense module 30 obtains a first reading of the accelerometer output (102). Scale factor control module 32 and scale factor control circuitry 28 set the scale factor of the accelerometer to a second value by setting the effective spring constant holding proof mass 42 in the frame 40 to a second value (104). While the scale factor of the accelerometer is set to the second value, sense module 30 obtains a second reading of the accelerometer output (106). Based on the first reading of the accelerometer output and the second reading of the accelerometer output, controller 34 determines a bias correction value (108). Sense module 30 obtains a third reading of the accelerometer output (110) and corrects the third reading of the accelerometer output based on the bias correction value (112).

To determine the bias correction value based on the first reading of the accelerometer output and the second reading of the accelerometer output, controller 34 extrapolates an accelerometer output for a scale factor value of zero. To correct the third accelerometer output based on the bias correction value, controller 34 subtracts the bias correction value from the third reading of the acceleration value.

In one example, to set the scale factor of the accelerometer to the first value by setting the effective spring constant holding proof mass 42 in frame 40 to a first value and to set the scale factor of the accelerometer to the second value by setting the effective spring constant holding proof mass 42 in frame 40 to a second value, scale factor control module 32 and scale factor control circuitry 28 cause a laser field to interact with an opto-mechanical structure coupled to proof mass 42.

In another example, to set the scale factor of the accelerometer to a first value by setting the effective spring constant holding proof mass 42 in frame 40 to a first value and to set the scale factor of the accelerometer to a second value by setting the effective spring constant holding proof mass 42 in frame 40 to a second value, scale factor control module 32 and scale factor control circuitry 28 adjust a laser field to interact with an opto-mechanical structure coupled to proof mass 42 so as to modify the net restoring force acting on proof mass 42. To adjust the laser field, scale factor control module 32 and scale factor control circuitry 28, may change the power emitted by a laser. To adjust the laser field, scale factor control module 32 and scale factor control circuitry 28, may additionally or alternatively detune the frequency of the laser field relative to a resonance of the opto-mechanical structure. To adjust the laser field, scale factor control module 32 and scale factor control circuitry 28 may additionally or alternatively modify the geometry by which the laser field is coupled to the opto-mechanical structure.

In another example, to set the scale factor of the accelerometer to the first value by setting the effective spring constant holding proof mass 42 in frame 40 to the first value and to set the scale factor of the accelerometer to the second value by setting the effective spring constant holding proof mass 42 in frame 40 to a second value, scale factor control module 32 and scale factor control circuitry 28 may adjust an electrostatic stiffening of anchors 44. In another example, to set the scale factor of the accelerometer to a first value by setting the effective spring constant holding proof mass 42 in frame 40 to a first value and to set the scale factor of the accelerometer to a second value by setting the effective spring constant holding proof mass 42 in frame 40 to a second value, scale factor control module 32 and scale factor control circuitry 28 may adjust a gain of a force rebalance circuit.

Except where indicated otherwise, the various steps described in FIGS. 8 and 9 do not necessarily need to be performed in the order shown in FIGS. 8 and 9. For example, in one implementation of the techniques of FIG. 8, scale factor control module 32 can modulate the scale factor while sense module 30 acquires acceleration data, so that the real acceleration data is upshifted away from a baseband. By demodulating the signal, controller 34 can determine the true acceleration (i.e. the acceleration excluding the forces created by scale factor control circuitry 28) without bias without using the explicit stepped procedure of calibrate, sense, calibrate, sense, and so on. Moreover, FIGS. 8 and 9 are intended to be alternative explanations, with some alternative example implementations provided, of the same general concepts. Therefore, it is also contemplated that the techniques of FIGS. 8 and 9 may be combined.

Figure 10C:
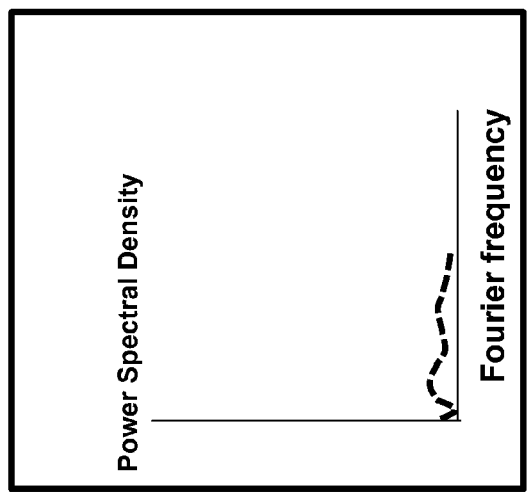
FIGS. 10A-10C show examples of continuous modulation of a scale factor to upshift real acceleration information away from zero in accordance with examples of this disclosure.
Figure 10B:
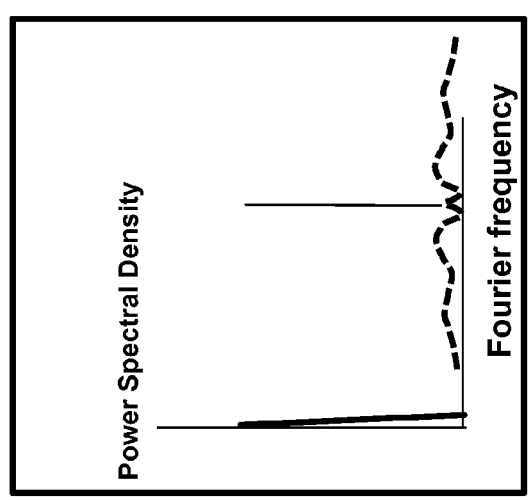
Figure 10A:
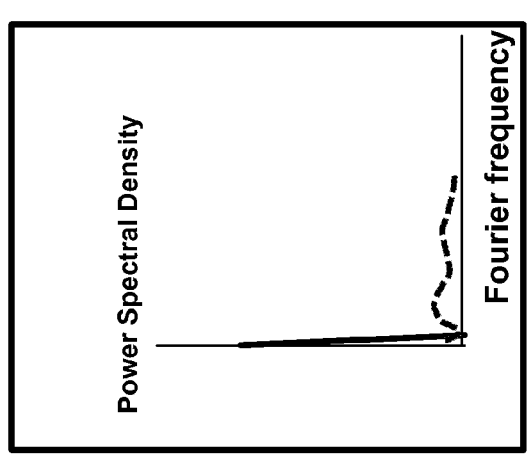

FIGS. 10A-10C collectively show an example of continuous modulation of scale factor to upshift real acceleration information away from zero Fourier frequency, while leaving the bias voltage unshifted. MEMS accelerometer system 20 may implement high pass filtering and subsequent demodulation of the signal to recover the real acceleration information, without the bias. FIG. 10A shows an example of an output signal that includes both the signal corresponding to a true acceleration value and the bias. As shown in FIG. 10B, MEMS accelerometer system 20 may modulate the scale factor at a frequency (f_dither) to upshift the signal. As shown in FIG. 10C, MEMS accelerometer system 20 may perform lock-in detection to extract a bias free signal.

In one or more examples, the functions described herein may be implemented in an accelerometer as hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted using any wired or wireless technologies, then such technologies are include in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses, including devices that incorporate integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, as described above, various units may be combined in a common hardware unit or provided by a collection of interoperative hardware units, including one or more processors as described above, in conjunction with suitable software and/or firmware.

Various examples have been described. These and other examples are within the scope of the following claims.

What is claimed is:

1. A method of calibrating an accelerometer, the method comprising:
   setting a scale factor of the accelerometer to a first value, wherein setting the scale factor of the accelerometer to the first value comprises modifying one or more parameters of a laser source;
   while the scale factor of the accelerometer is set to the first value, obtaining a first acceleration value;
   setting the scale factor of the accelerometer to a second value, wherein setting the scale factor of the accelerometer to the second value comprises further modifying the one or more parameters of the laser source;
   while the scale factor of the accelerometer is set to the second value, obtaining a second acceleration value;
   based on the first acceleration value and the second acceleration value, determining a bias correction value;
   obtaining a third acceleration value; and
   correcting the third acceleration value based on the bias correction value.

2. The method of claim 1, wherein the first value is greater than zero and the second value is greater than zero, and wherein determining the bias correction value comprises, based on the first reading of the acceleration value and the second reading of the acceleration value, linearly extrapolating an acceleration value for a scale factor of zero.

3. The method of claim 1, wherein correcting the third reading of the acceleration value based on the bias correction value comprises subtracting the bias correction value from the third reading of the acceleration value.

4. The method of claim 1, wherein setting the scale factor of the accelerometer to the first value and setting the scale factor of the accelerometer to the second value further comprises modifying a number of photons circulating within an optical resonator of an anchor element of the accelerometer.

5. The method of claim 1, wherein modifying the one or more parameters of the laser source comprises adjusting a laser field in a cavity of an anchor element of the accelerometer to modify restoring forces of one or more beams of the cavity.

6. The method of claim 5, wherein adjusting the laser field comprises changing an intensity of the laser field.

7. The method of claim 5, wherein adjusting the laser field comprises detuning the laser field relative to a resonance of the cavity.

8. The method of claim 5, wherein adjusting the laser field comprises modifying a geometry by which the laser is coupled to the cavity.

9. The method of claim 1, wherein the one or more parameters of the laser source comprise at least one of a power of the laser source or a wavelength of the laser source.

10. An accelerometer device comprising:
    a proof mass;
    one or more anchor elements connected to the proof mass;
    a scale factor control module configured to:
      set a scale factor of the one or more anchor elements of the proof mass to a first value, wherein the scale factor control module is configured to set the scale factor of the one or more anchor elements of the proof mass to the first value by modifying one or more parameters of a laser source;
      set the scale factor of the one or more anchor elements of the proof mass to a second value, wherein the scale factor control module is further configured to set the scale factor of the one or more anchor elements of the proof mass to the second value by further modifying one or more parameters of the laser source;

a sensing module configured to:
while the scale factor of the one or more anchor elements of the proof mass is set to the first value, obtain a first acceleration value;
while the scale factor of the one or more anchor elements of the proof mass is set to the second value, obtain a second acceleration value;
obtain a third acceleration value;

a controller configured to:
determine a bias correction value based on the first acceleration value and the second acceleration value; and
correct the third acceleration value based on the bias correction value.

11. The accelerometer device of claim 10, wherein the first value is greater than zero and the second value is greater than zero, and wherein the controller is further configured to determine the bias correction value, based on the first acceleration value and the second acceleration value, by linearly extrapolating an acceleration value for a scale factor of zero.

12. The accelerometer device of claim 10, wherein the controller is further configured to correct the third acceleration value based on the bias correction value by subtracting the bias correction value from the third acceleration value.

13. The accelerometer device of claim 10, wherein the scale factor control module is further configured to set the scale factor of the one or more anchor elements of the proof mass to the first value and set the scale factor of the one or more anchor elements of the proof mass to the second value by modifying a number of photons circulating within an optical resonator of the one or more anchor elements.

14. The accelerometer device of claim 10, wherein the scale factor control module is further configured to modify the one or more parameters of the laser source by adjusting a laser field in a cavity of the one or more anchor elements to modify restoring forces of one or more beams of the cavity.

15. The accelerometer device of claim 14, wherein the scale factor control module is further configured to adjust the laser field by causing a change in an intensity of the laser field.

16. The accelerometer device of claim 14, wherein the scale factor control module is further configured to adjust the laser field by causing a detuning of the laser field relative to a resonance of the cavity.

17. The accelerometer device of claim 14, wherein the scale factor control module is further configured to adjust the laser field by causing a modification of a geometry by which the laser is coupled to the cavity.

18. The accelerometer device of claim 10, wherein the one or more parameters of the laser source comprise at least one of a power of the laser source or a wavelength of the laser source.

19. An accelerometer device comprising:
a proof mass;
one or more anchor elements connected to the proof mass;
a scale factor control module configured to:
set a scale factor of the one or more anchor elements of the proof mass to a first value, wherein the scale factor control module is configured to set the scale factor of the one or more anchor elements of the proof mass to the first value by electrostatically stiffening the one or more anchor elements of the accelerometer;
set the scale factor of the one or more anchor elements of the proof mass to a second value, wherein the scale factor control module is further configured to set the scale factor of the one or more anchor elements of the proof mass to the second value by electrostatically stiffening the one or more anchor elements of the accelerometer;
a sensing module configured to:
while the scale factor of the one or more anchor elements of the proof mass is set to the first value, obtain a first acceleration value;
while the scale factor of the one or more anchor elements of the proof mass is set to the second value, obtain a second acceleration value;
obtain a third acceleration value;
a controller configured to:
determine a bias correction value based on the first acceleration value and the second acceleration value; and
correct the third acceleration value based on the bias correction value.

* * * * *